United States Patent
Yoshida

(10) Patent No.: US 10,075,120 B2
(45) Date of Patent: Sep. 11, 2018

(54) MOTOR DRIVE DEVICE

(71) Applicant: FANUC CORPORATION, Yamanashi (JP)

(72) Inventor: Tomokazu Yoshida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/843,772

(22) Filed: Dec. 15, 2017

(65) Prior Publication Data

US 2018/0175775 A1 Jun. 21, 2018

(30) Foreign Application Priority Data

Dec. 21, 2016 (JP) ................. 2016-247958

(51) Int. Cl.
*H02P 6/34* (2016.01)
*H02P 21/16* (2016.01)
*H02H 3/52* (2006.01)
*H02P 27/06* (2006.01)

(52) U.S. Cl.
CPC .................. *H02P 27/06* (2013.01)

(58) Field of Classification Search
CPC .................. H02P 3/14; H02P 1/029
See application file for complete search history.

(56) References Cited

U.S. PATENT DOCUMENTS

| | | |
|---|---|---|
| 9,557,360 B2 | 1/2017 | Yoo |
| 9,618,558 B2 | 4/2017 | Yoshida |
| 2005/0169018 A1* | 8/2005 | Hatai ............... H02M 7/53871 363/37 |
| 2010/0070212 A1* | 3/2010 | Williams ............... G01R 31/42 702/58 |
| 2010/0295554 A1* | 11/2010 | Alho ..................... G01R 31/42 324/548 |

(Continued)

FOREIGN PATENT DOCUMENTS

| | | |
|---|---|---|
| JP | 2001-309561 | 11/2001 |
| JP | 2014-25927 | 2/2014 |
| JP | 2015-106961 | 6/2015 |

(Continued)

*Primary Examiner* — Bickey Dhakal
*Assistant Examiner* — Charles S Laughlin
(74) *Attorney, Agent, or Firm* — Wenderoth, Lind & Ponack, L.L.P.

(57) ABSTRACT

A motor drive device includes: reverse converter that converts DC power from a forward converter into AC power; a DC link capacitor provided in a DC link; a first current detection part that detects current flowing between the forward converter and capacitor; a second current detection part that detects current flowing between the capacitor and reverse converter; a voltage detection part that detects a voltage of the capacitor; and a capacitance decline detection part that obtains a change value in electric charge of the capacitor from a n integrated value by integrated a predetermined time of a difference in current values detected by the current detection parts, obtains a capacitance value of the capacitor based on the obtained change amount in electric charge and change amount in voltage of the capacitor for the predetermined time, and detects a capacitance decline in the capacitor based on the obtained capacitance value.

3 Claims, 7 Drawing Sheets

(56) References Cited

U.S. PATENT DOCUMENTS

2014/0032145 A1    1/2014   Yoo
2016/0274172 A1    9/2016   Yoshida

FOREIGN PATENT DOCUMENTS

| JP | 2016-46946 | 4/2016 |
|----|------------|--------|
| JP | 2016-167948 | 9/2016 |
| JP | 2016-178823 | 10/2016 |
| WO | 2004/084395 | 9/2004 |

\* cited by examiner

MOTOR DRIVE DEVICE

This application is based on and claims the benefit of priority from Japanese Patent Application No. 2016-247958, filed on 21 Dec. 2016, the content of which is incorporated herein by reference.

BACKGROUND OF THE INVENTION

Field of the Invention

The present invention relates to a motor drive device.

Related Art

A motor drive device has been known that drives the motors within machine tools, industrial machines, forge rolling machines, injection molding machines or various robots (for example, refer to Patent Documents 1 and 2). Such a motor drive device includes a forward converter that converts AC power to DC power, a reverse converter that converts the DC power from the forward converter into AC power, and a DC link capacitor provided to a DC link between the forward converter and reverse converter.

However, the DC link capacitor may have a decline in electrostatic capacitance (hereinafter referred to simply as "capacitance") due to the repeat of charge-discharge. If the capacitance of the DC link capacitor declines, the ripple current flowing to the DC link will increase, and the variation in DC voltage will increase.

Concerning this point, it has been known to detect the capacitance decline of the DC link capacitor using the time-integrated value for the charging current of the DC link capacitor and the voltage value of the DC link capacitor, during the initial charging of the DC link capacitor. Hereinafter, an example of detecting the capacitance decline of the DC link capacitor during the initial charging of the DC link capacitor will be explained.

FIG. 6 is a view showing a circuit configuration for a conventional motor drive device. This motor drive device 1X includes a converter section 10X and an inverter section 20X. The converter section 10X includes a forward converter 11 that converts the three-phase AC power from an AC power source 2 into DC power, and supplies the DC power to the inverter section 20X. The inverter section 20X includes a reverse converter 21 that converts the DC power from the converter section 10X into three-phase AC power, and supplies the three-phase AC power to a motor 3. The inverter section 20X includes a DC link capacitor 22 provided in the DC link between the forward converter 11 and reverse converter 21.

The converter section 10X has a capacitance decline detection function for the DC link capacitor 22. More specifically, the converter section 10X includes current detection parts 13, 14 that detect the AC current inputted to the forward converter 11, a voltage detection part 15 that detects the output voltage of the forward converter 11 (i.e. voltage of DC link capacitor 22 provided to the DC link), a storage part 16 that stores a threshold value for detecting the capacitance decline of the DC link capacitor 22, and a capacitance decline detection part 17. The capacitance decline detection part 17, during the initial charging of the DC link capacitor 22, obtains the capacitance value for the DC link capacitor 22, based on a time-integrated value (electric charge) for the charging current of the DC link capacitor 22 obtained based on the current detected by the current detection parts 13, 14; and the voltage value of the DC link capacitor 22 detected by the voltage detection part 15.

FIG. 7 provides graphs showing the time changes of the charging current and voltage during initial charging of the DC link capacitor in a conventional motor drive device. In FIG. 7, the time t1 is the charging start time, and the time t2 is the time during charging operation. As shown in FIG. 7, initial charging is the charging from when the electric charge of the DC link capacitor 22 is 0 C, and the voltage is 0 V. When defining the voltage value of the DC link capacitor 22 at time t2 as V1, the electric charge of the DC link capacitor 22 at time t2 as Q1, and the time-integrated value for the charging current of the DC link capacitor 22 from time t1 until time t2 as $\int I1 dt$, the capacitance value C1 of the DC link capacitor 22 is obtained by the following Formula (1).

[Formula 1]

$$C1 = \frac{Q1}{V1} = \frac{\int I1 dt}{V1} \quad (1)$$

The capacitance decline detection part 17 detects the capacitance decline of the DC link capacitor 22, when the capacitance value obtained using the above Formula (1) is less than the threshold stored in the storage part 16.

Patent Document 1: Japanese Unexamined Patent Application, Publication No. 2016-178823

Patent Document 2: Japanese Unexamined Patent Application, Publication No. 2014-25927

SUMMARY OF THE INVENTION

However, since the conventional motor drive device 1X performs capacitance decline detection during the initial charging operation from when the electric charge of the DC link capacitor 22 is 0 C and the voltage is 0 V, in the case of the initial charging operation not being performed over a long time period, it is not possible to detect the capacitance decline of the DC link capacitor 22.

In addition, as shown in FIG. 8, in the case of connecting a plurality of the inverter sections 20X to the converter section 10X, it is only possible to detect the capacitance decline for the total capacitance of the plurality of DC link capacitors 22, and it is not possible to detect the capacitance decline for individual DC link capacitors 22.

Incidentally, Patent Documents 1 and 2 disclose technology that enables detecting the capacitance decline of DC link capacitors other than during the initial charging operation. Patent Document 1 discloses a motor drive device having a lifespan determination means for a DC capacitor (DC link capacitor). This motor drive device interrupts the supply of AC power from the power source after charging the DC capacitor, calculates the estimated capacitance of the DC capacitor based on the time-integrated value for the discharge current of the DC capacitor and the voltage value for the DC capacitor prior to discharge, and performs lifespan determination of the DC capacitor. According to this motor drive device, even in the case of connecting a plurality of inverter sections to the converter section, it is said to be possible to detect the capacitance decline of individual DC link capacitors.

In addition, Patent Document 2 discloses a capacitance estimation device for DC link capacitors of an inverter. This capacitance estimation device estimates the capacitance of the DC link capacitor based on the size of ripple in the DC link capacitor, based on a capacitance decline of the DC link capacitor influencing the size of ripple in the DC link voltage.

The present invention has an object of providing a motor drive device that can detect a capacitance decline in a DC link capacitor even other than during initial charging operation, by way of a different technique from the above-mentioned Patent Documents 1 and 2. In addition, the present invention has an object of providing a motor drive device that can detect a capacitance decline in individual DC link capacitors in a plurality of inverter sections, even in a case of connecting a plurality of inverter sections including a reverse converter and DC link capacitor to a converter section including a forward converter.

(1) A motor drive device (e.g., the motor drive device 1 described later) according to the present invention includes: at least one reverse converter (e.g., the reverse converter 21 described later) that converts DC power from a forward converter (e.g., the forward converter 11 described later), which converts AC power into the DC power, into AC power; a DC link capacitor (e.g., the DC link capacitor 22 described later) provided to each of the reverse converters in a DC link (e.g., the DC link 30 described later) between the forward converter and the reverse converter; a first current detection part (e.g., the first current detection part 23 described later) that detects current flowing between the forward converter and the DC link capacitor in the DC link; a second current detection part (e.g., the second current detection part 24 described later) that detects current flowing between the DC link capacitor and the reverse converter in the DC link; a voltage detection part (e.g., the voltage detection part 25 described later) that detects a voltage of the DC link capacitor; and a capacitance decline detection part (e.g., the capacitance decline detection part 27 described later) that obtains, from an integrated value by integrating a difference between a current value detected by the first current detection part and a current value detected by the second current detection part over a predetermined time, a change amount in electric charge of the DC link capacitor for the predetermined time; obtains a change amount in voltage of the DC link capacitor for the predetermined time based on a voltage value detected by the voltage detection part; obtains a capacitance value of the DC link capacitor based on the change amount in electric charge and the change amount in voltage obtained; and performs detection of a capacitance decline in the DC link capacitor based on the capacitance value obtained.

(2) The motor drive device described in (1) may further include: a storage part (e.g., the storage part 26 described later) that stores in advance a threshold for detecting the capacitance decline in the DC link capacitor, wherein the capacitance decline detection part may detects that the capacitance of the DC link capacitor has declined in a case of the capacitance value obtained being less than the threshold.

(3) The motor drive device described in (2), wherein the storage part may externally allow for rewriting of the threshold.

According to the present invention, it is possible to provide a motor drive device that can detect a capacitance decline in a DC link capacitor even other than during initial charging operation. In addition, according to the present invention, it is possible to provide a motor drive device that can detect a capacitance decline in individual DC link capacitors in a plurality of inverter sections, even in a case of connecting a plurality of inverter sections including a reverse converter and DC link capacitor to a converter section including a forward converter.

DETAILED DESCRIPTION OF THE INVENTION

Hereinafter, an example of an embodiment of the present invention will be explained by referencing the drawings. It should be noted that the same reference symbols shall be attached to identical or corresponding portions in the respective drawings.

Figure 1:
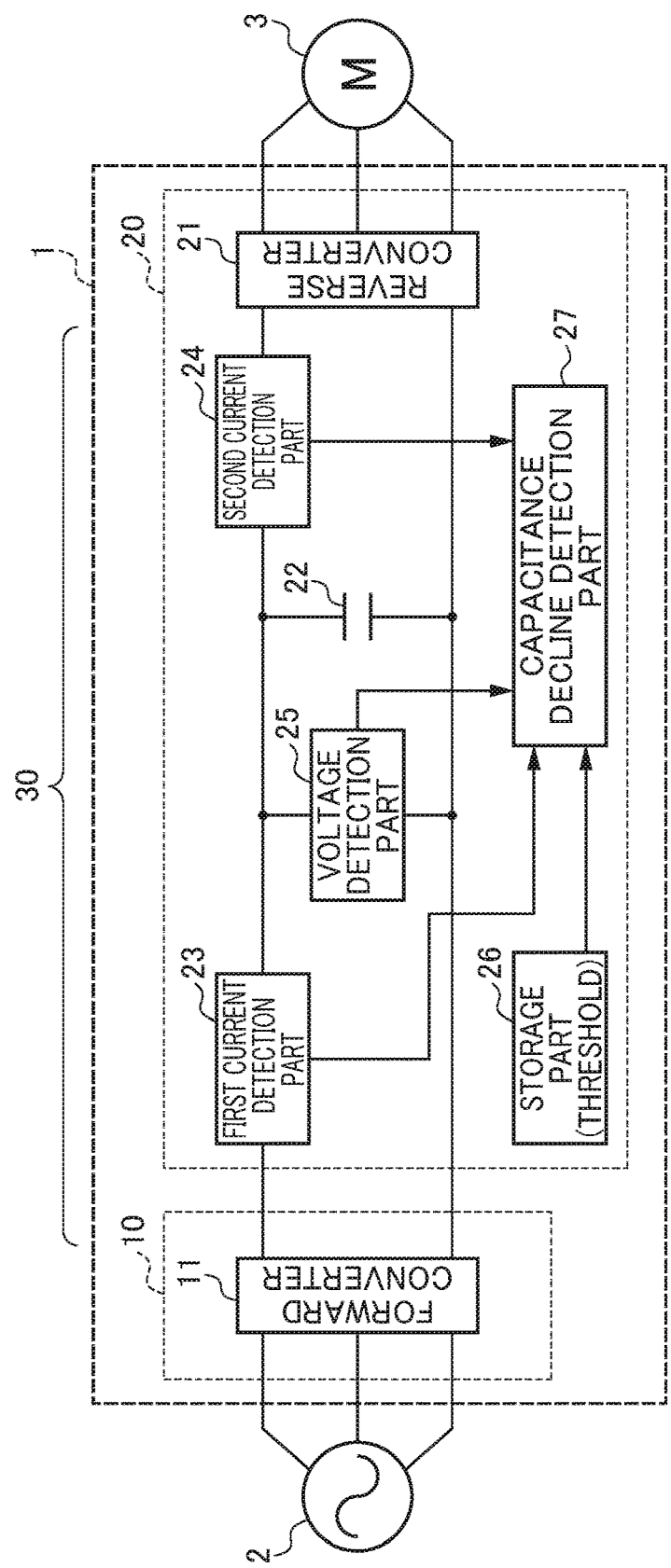
FIG. 1 is a view showing a circuit configuration of a motor drive device according to an embodiment of the present invention.

FIG. 1 is a view showing a circuit configuration of a motor drive device according to an embodiment of the present invention. A motor drive device 1 shown in FIG. 1 is inputted a commercial three-phase AC power source 2 to drive a motor 3. It should be noted that the AC power source 2 is not limited to three-phase alternating current, and may be single-phase alternating current, for example. The motor drive device 1 includes a converter section 10 and an inverter section 20.

The converter section 10 includes a forward converter 11. The forward converter 11 converts the AC power from the AC power source 2 into DC power. The forward converter 11, for example, is configured by a power semiconductor device and a diode rectifying converter or PWM converter having a bridge circuit of a diode connected reversely parallel to the power semiconductor device.

The inverter section 20 includes a reverse converter 21, DC link capacitor 22, first current detection part 23, second current detection part 25, voltage detection part 25, storage part 26, and capacitance decline detection part 27.

The reverse converter 21 converts the DC power from the forward converter 11 into AC power, and supplies this AC power to the motor 3. The reverse converter 21, for example, is configured from a power semiconductor device and a bridge circuit having a diode connected reversely parallel to this. The reverse converter 21 converts the DC voltage into an AC voltage of a desired waveform and frequency, by on-off controlling (e.g., PWM controlling) these power semiconductor devices according to the commands from a control unit (not illustrated).

In addition, the reverse converter 21 converts the AC power regenerated from the motor 3 into DC power, and supplies this DC power to a DC link 30 between the reverse converter 21 and forward converter 11.

The DC link capacitor 22 is provided to the DC link 30 between the forward converter 11 and reverse converter 21. The DC link capacitor 22 stores the DC power from the forward converter 11 and the DC power (regeneration power) from the reverse converter 21. In addition, the DC link capacitor smooths the DC voltage converted by the forward converter 11 or reverse converter 21.

The first current detection part 23 is provided between the forward converter 11 and DC link capacitor 22 of the DC link 30, and detects the current flowing through this portion. The second current detection part 24 is provided between the DC link capacitor 22 and reverse converter 21 of the DC link 30, and detects the current flowing through this portion. As the first current detection part 23 and second current detection part 24, it is possible to use existing current detection circuits, for example.

The voltage detection part 25 is provided in parallel with the DC link capacitor 22, and detects the voltage between both terminals of the DC link capacitor 22. As the voltage detection part 25, it is possible to use an existing voltage detection circuit, for example.

The storage part 26 stores in advance a threshold for detecting the capacitance decline of the DC link capacitor 22. The threshold is a value arrived at by multiplying a predetermined proportion (e.g., 60%) by the initial capacitance value (e.g., capacitance value during non-use) of the DC link capacitor 22, for example. The storage part 26 is re-writable memory such as EEPROM, for example. The storage part 26 thereby enables rewriting of the threshold according to an external device such as a computer, for example. In addition, the storage part 26 stores predetermined software (programs) for realizing various functions of the capacitance decline detection part 27.

The capacitance decline detection part 27 obtains a change amount in the electric charge of the DC link capacitor 22 at a predetermined time, based on the current value detected by the first current detection part 23 and the current value detected by the second current detection part 24. More specifically, the capacitance decline detection part 27 obtains the change amount in electric charge of the DC link capacitor 22, from the integrated value by integrating the difference between the current value detected by the first current detection part 23 and the current value detected by the second current detection part 24 over a predetermined time. In addition, the capacitance decline detection part 27 obtains the change amount in the voltage of the DC link capacitor 22 at a predetermined time, based on the voltage value detected by the voltage detection part 25.

The capacitance decline detection part 27 obtains the capacitance value for the DC link capacitor 22 based on the change amount in electric charge and change amount in voltage thus obtained. The capacitance decline detection part 27 performs detection of the capacitance decline of the DC link capacitor 22 based on the obtained capacitance value. More specifically, the capacitance decline detection part 27 detects that the capacitance of the DC link capacitor 22 has declined in the case of the obtained capacitance value being less than the threshold in the storage part 26.

The capacitance decline detection part 27 is configured by an arithmetic processor such as a DSP (Digital Signal Processor) or FPGA (Field-Programmable Gate Array), for example. The functions of the capacitance decline detection part 27 are realized by executing predetermined software (programs) stored in the storage part 26. The functions of the capacitance decline detection part 27 may be realized by cooperation between hardware and software, or may be realized by only hardware (electronic circuits).

Figure 2:
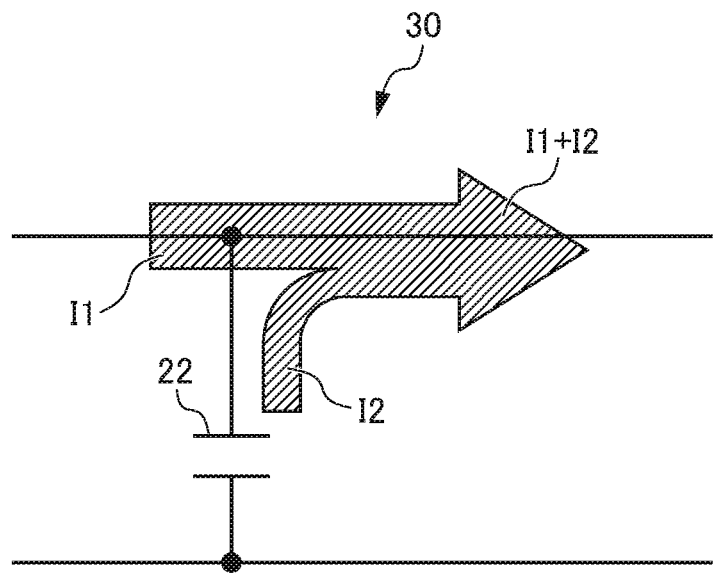
FIG. 2 is a drawing showing current flowing through a DC link of the motor drive device during motor acceleration.
Figure 3:
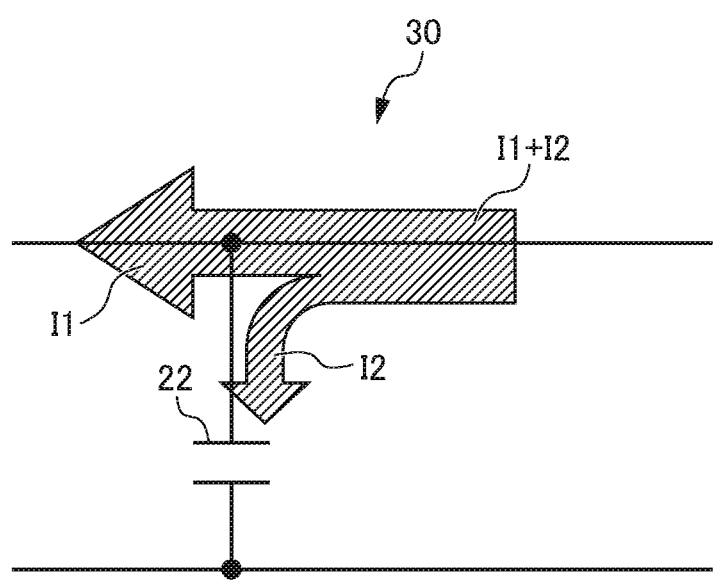
FIG. 3 is a drawing showing current flowing though the DC link of the motor drive device during motor deceleration (during regeneration)

Next, detection operations for capacitance decline of the DC link capacitor 22 by the motor drive device 1 will be explained by referencing FIGS. 1 to 3. FIG. 2 is a drawing showing current flowing through the DC link 30 of the motor drive device 1 during motor acceleration, and FIG. 3 is a drawing showing current flowing through the DC link 30 of the motor drive device 1 during motor deceleration (during regeneration).

(During Motor Acceleration)

First, as shown in FIGS. 1 and 2, current of current value I1 +I2 from the current of current value I1 from the forward converter 11 and current of current value I2 from the DC link capacitor 22 being added is supplied to the reverse converter 21, during motor acceleration.

At this time, the first current detection part 23 detects the current of current value I1, i.e. inflow current to DC link 30. In addition, the second current detection part 24 detects the current of current value I1 +I2, i.e. outflow current from DC link 30. In addition, the voltage detection part 25 detects the voltage of the DC link capacitor 22.

The capacitance decline detection part 27 successively calculates a difference current value I2 between the current value I1 detected by the first current detection part 23 and the current value I1 +I2 detected by the second current detection part 24, and obtains a time-integrated value $\int I2dt$ for the difference current value I2 calculated for a predetermined time. Herein, the difference current value I2 is a current value supplied from the DC link capacitor 22 to the reverse converter 21; therefore, the time-integrated value $\int I2dt$ is the electric charge released from the DC link capacitor 22, i.e. a change amount (decrease amount) $\Delta Q$ in electric charge of the DC link capacitor 22.

In addition, the capacitance decline detection part 27 obtains a change amount (drop amount) $\Delta V$ in the voltage for a predetermined time from the voltage detected by the voltage detection part 25.

Next, the capacitance decline detection part 27 obtains the capacitance value C of the DC link capacitor 22 based on the following Formula (2), from the obtained change amount in electric charge $\Delta Q$ and change amount in voltage $\Delta V$, i.e. obtained time-integrated value $\int I2dt$ and change amount in voltage $\Delta V$.

[Formula 2]

$$C = \frac{\Delta Q}{\Delta V} = \frac{\int I2dt}{\Delta V} \quad (2)$$

Next, the capacitance decline detection part 27 compares the obtained capacitance value C and threshold in the storage part 26, and detects that the capacitance of the DC link capacitor 22 has declined in the case of the obtained capacitance value C being less than the threshold. It should be noted that, in the case of the obtained capacitance value C being at least the threshold, it is determined that the capacitance of the DC link capacitor 22 has not declined.

(During Motor Deceleration)

Next, as shown in FIGS. 1 and 3, during motor deceleration (during regeneration), current of current value I1 +I2 is generated from the reverse converter 21 towards the forward converter 11 and DC link capacitor 22, current of current value I1 is regenerated at the forward converter 11, and the DC link capacitor 22 is charged with the current of current value I2.

At this time, the first current detection part 23 detects current of current value I1, i.e. outflow current from the DC link 30. In addition, the second current detection part 24 detects current of current value I1 +I2, i.e. inflow current to the DC link 30.

The capacitance decline detection part 27, successively calculates a difference current value I2 between the current value I1 detected by the first current detection part 23 and the current value I1 +I2 detected by the second current detection part 24, and obtains a time-integrated value $\int I2dt$ for the difference current value I2 calculated for a predetermined time, similarly to as mentioned above. Herein, the difference current value I2 is current charging the DC link capacitor 22; therefore, the time-integrated value $\int I2dt$ is the electric charge stored in the DC link capacitor 22, i.e. the change amount (increase amount) in electric charge of the DC link capacitor 22.

In addition, the capacitance decline detection part 27 obtains the change amount (rise amount) $\Delta V$ in voltage for a predetermined time from the voltage detected by the voltage detection part 25.

Next, the capacitance decline detection part 27, similarly to as mentioned above, obtains the capacitance value C of the DC link capacitor 22 based on the above Formula (2), from the obtained change amount in electric charge $\Delta Q$ and change amount in voltage $\Delta V$, i.e. obtained time-integrated value $\int I2dt$ and change amount in voltage $\Delta V$.

Next, the capacitance decline detection part 27, similarly to as mentioned above, compares the obtained capacitance value C and threshold in the storage part 26, and detects that the capacitance of the DC link capacitor 22 has declined in the case of the obtained capacitance value C being less than the threshold. It should be noted that, in the case of the obtained capacitance value C being at least the threshold, it is determined that the capacitance of the DC link capacitor 22 has not declined.

As explained above, according to the motor drive device 1 of the present embodiment, the time-integrated value for the difference current value between the inflow current to the DC link capacitor 22 and outflow current from the DC link capacitor 22 (i.e. time-integrated value for difference current value between inflow current to DC link 30 and outflow current from DC link 30), i.e. change amount in electric charge of the DC link capacitor 22, is obtained by the first current detection part 23, second current detection part 24 and capacitance decline detection part 27, and the change amount in voltage of the DC link capacitor 22 is obtained by the voltage detection part 25 and capacitance decline detection part 27. Then, the capacitance decline detection part 27 obtains the capacitance value for the DC link capacitor 22 based on this change amount in electric change and change amount in voltage, and performs detection of a capacitance decline in the DC link capacitor 22 based on this capacitance value. It is thereby possible to detect a capacitance decline in the DC link capacitor 22 even other than during the initial charging operation.

In addition, according to the motor drive device 1 of the present embodiment, it is not necessary to interrupt the supply of AC power from the AC power source 2 after charging the DC link capacitor 22 as in Patent Document 1. Therefore, it is possible to perform detection of a capacitance decline in the DC link capacitor 22 even during normal operation.

Figure 4:
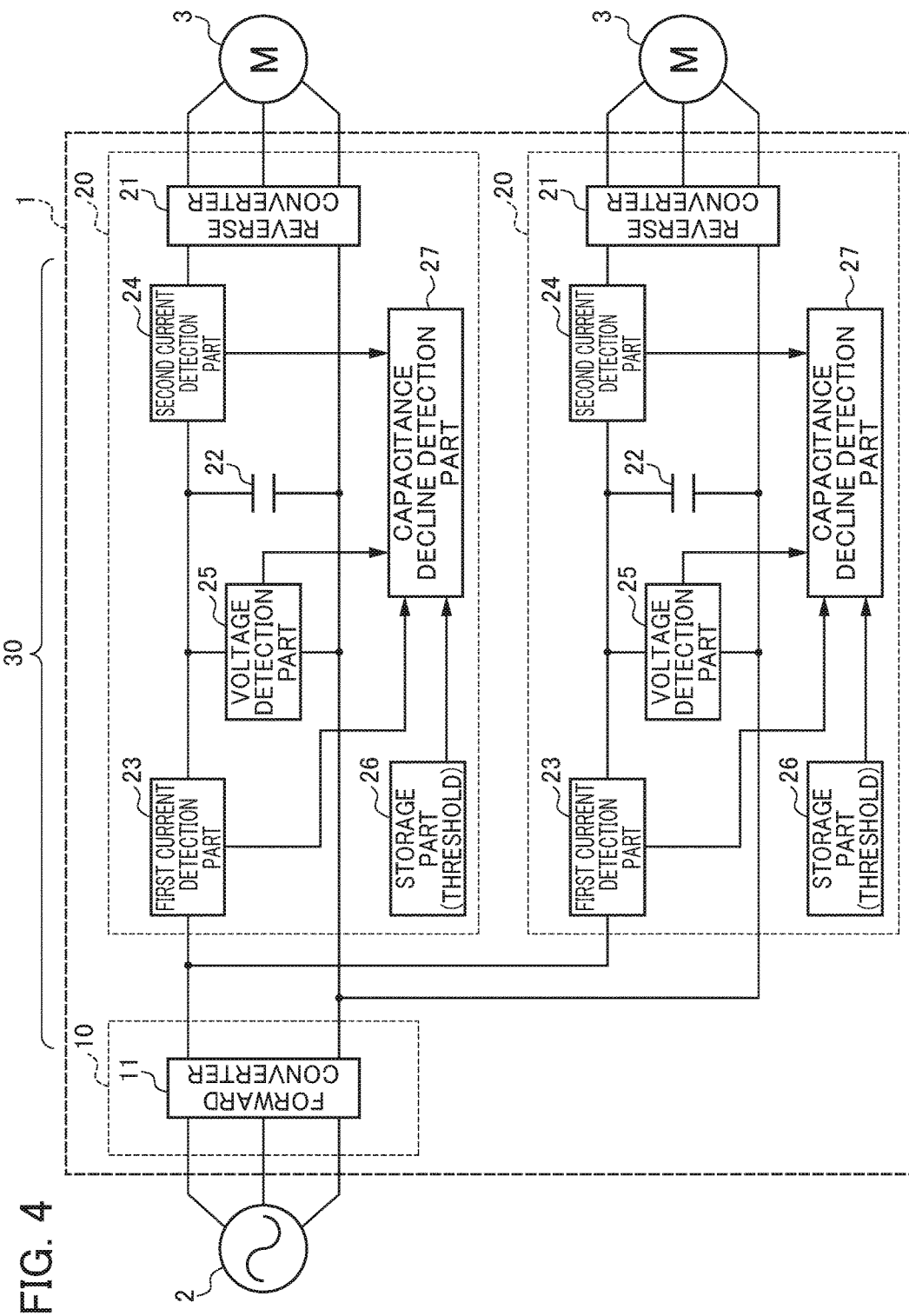
FIG. 4 is a view showing a circuit configuration of the motor drive device according to the embodiment of the present invention.

Incidentally, in the case of there being a plurality of drive shafts (feed shaft and spindle) in a machine tool, a plurality of the motors 3 will also be provided in order to drive the respective drive shafts (refer to FIG. 4). In this case, the plurality of inverter sections 20 is connected in the same number as the number of motors 3 in parallel in order to drive and control the motors 3 by individually supplying the drive power to the respective motors 3.

In this way, even in a case of connecting a plurality of the inverter sections 20 which include one of each of a reverse converter 21 and DC link capacitor 22 (providing a DC link capacitor 22 to every reverse converter 21 so that the reverse converter 21 and DC link capacitor 22 are in a 1-to-1 relationship) to a converter section 10 including the forward converter 11, according to the motor drive device 1 of the present embodiment, it will be possible to detect a capacitance decline in the individual DC link capacitors 22 of the plurality of inverter sections 22, by including the first current detection part 23, second current detection part 24, voltage detection part 25 and capacitance decline detection part 27 in the respective inverter sections 20.

In addition, in the motor drive device 1 of the present embodiment, since the threshold is rewritable by an external device, the motor drive device 1 can change the threshold to an appropriate value even after once setting the value.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

Figure 5:
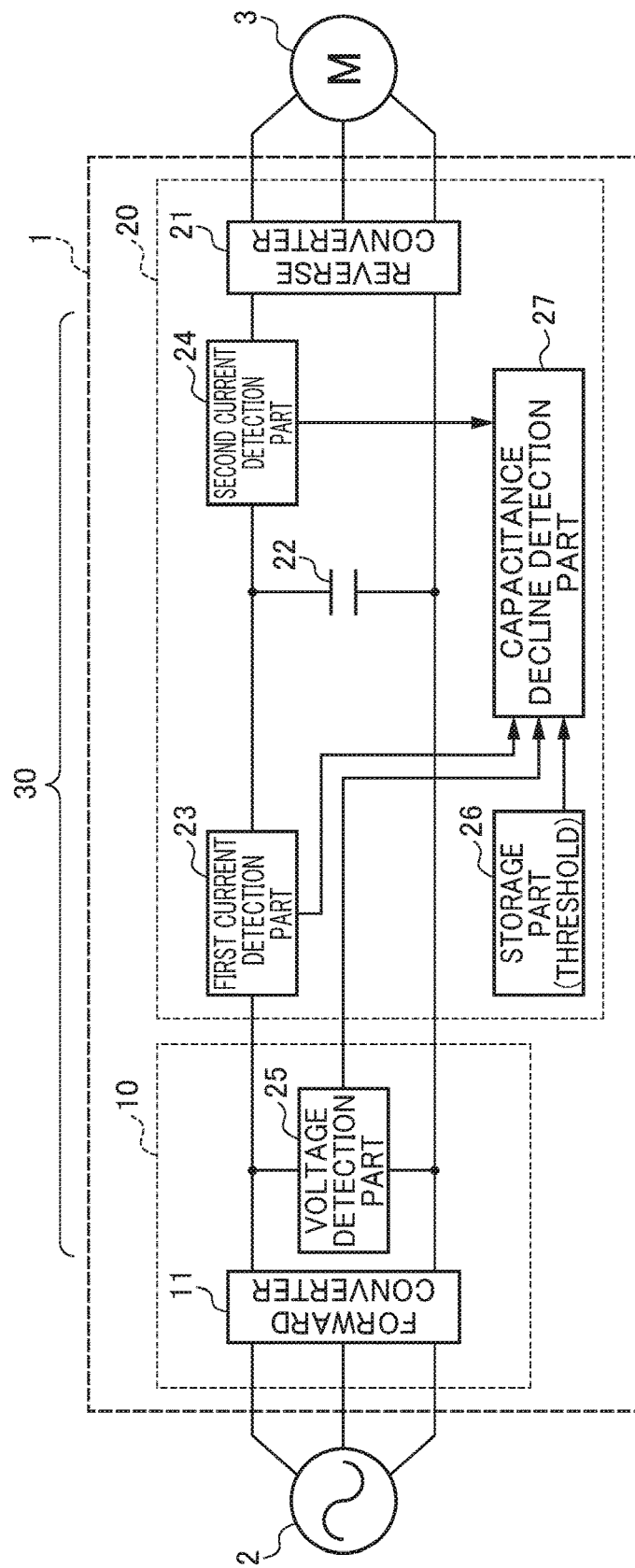
FIG. 5 is a view showing a circuit configuration of the motor drive device according to a modified example of the present invention.
Figure 6:
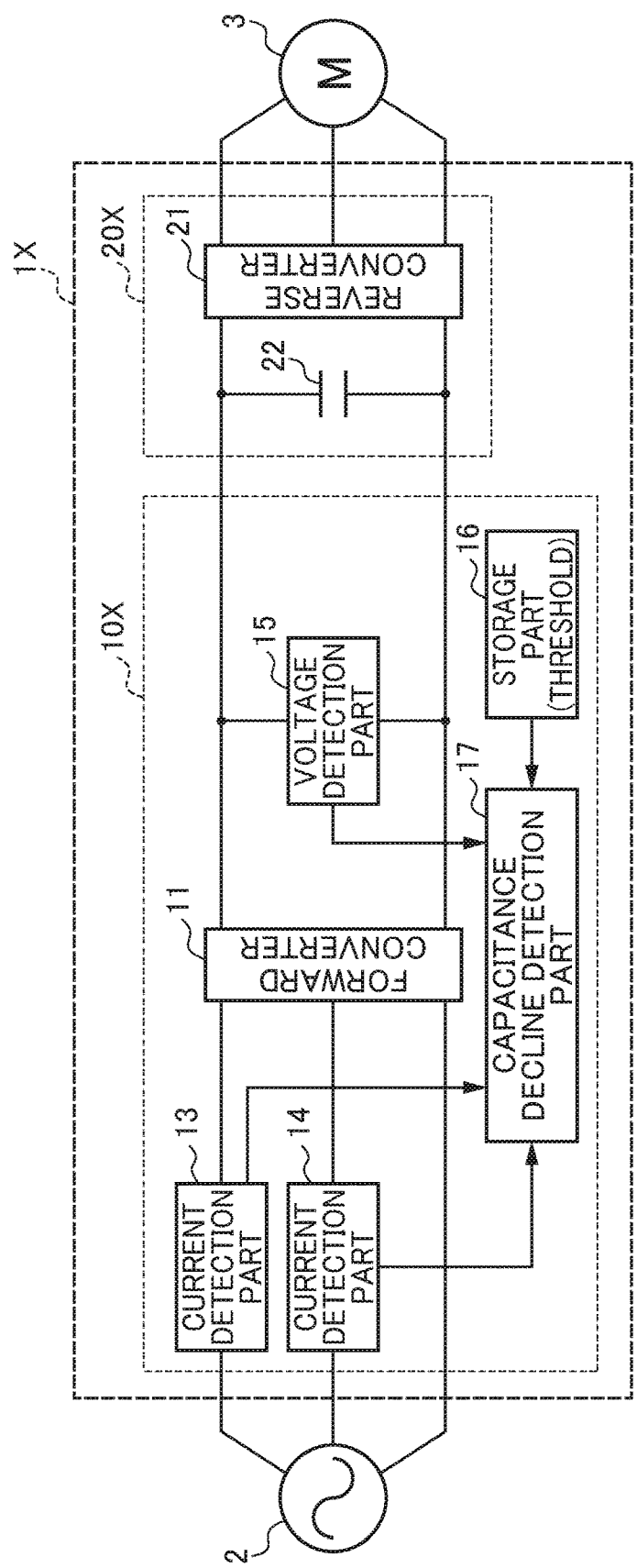
FIG. 6 is a view showing a circuit configuration of a conventional motor drive device.
Figure 7:
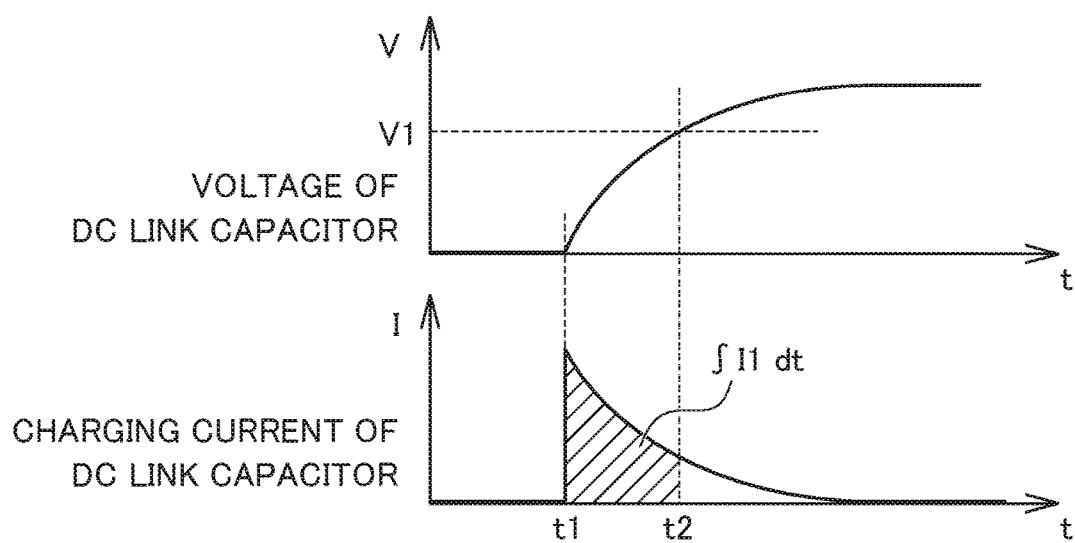
FIG. 7 provides graphs showing the time changes of the charging current and voltage during initial charging of a DC link capacitor in a conventional motor drive device.
Figure 8:
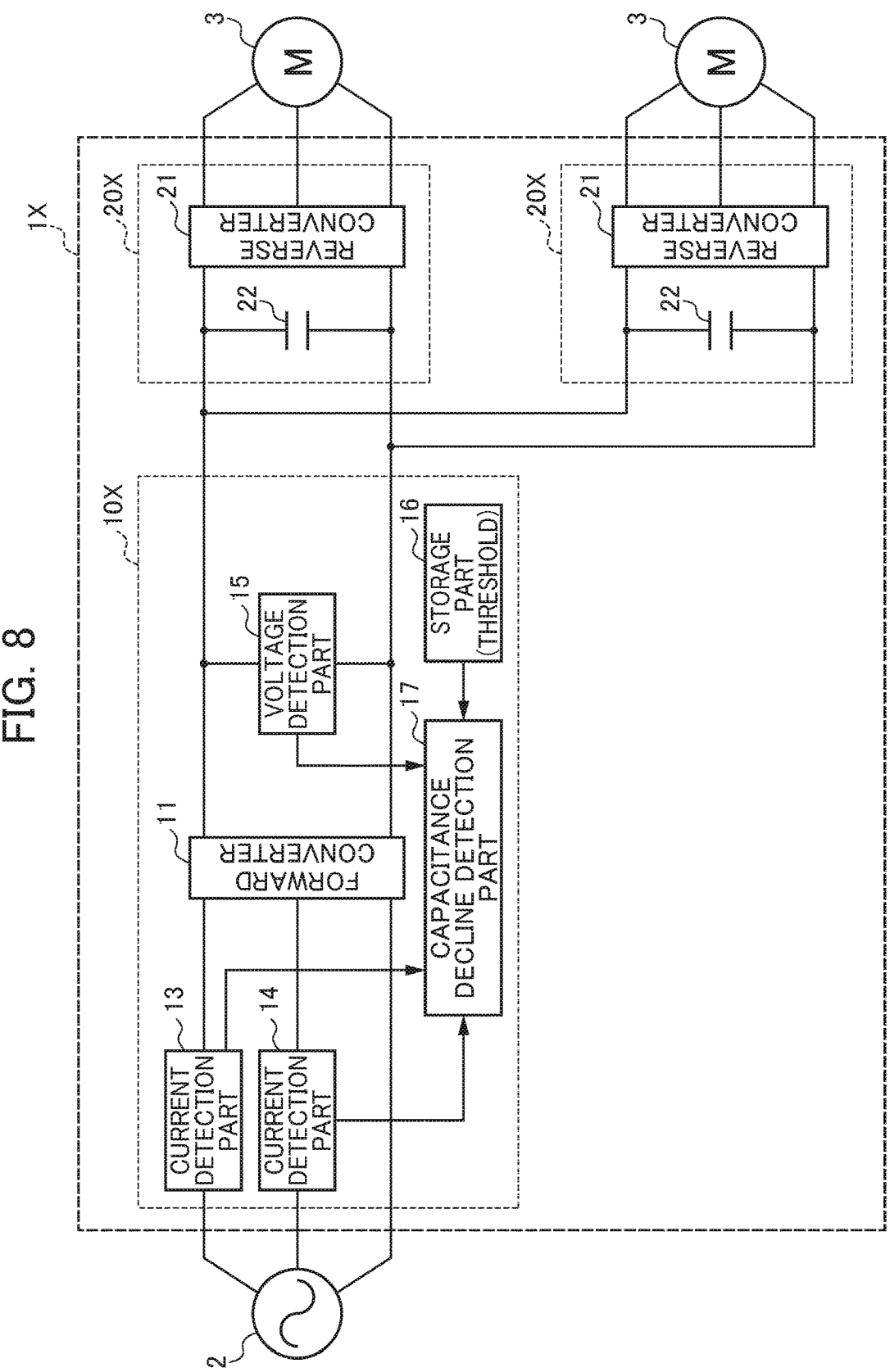
FIG. 8 is a view showing a circuit configuration of a conventional motor drive device.

For example, in the aforementioned embodiment, the voltage detection part 25 is provided to each of the inverter sections 20; however, as shown in FIG. 5, only one voltage detection part 25 may be provided to the converter section 10. It should be noted that, although an embodiment in which only one inverter section 20 is provided is illustrated in FIG. 5, a plurality of the inverter sections 20 may be provided.

In addition, in the aforementioned embodiment, although the current is directly detected by the second current detection part 24, it is not limited thereto. In place of current detection by the second current detection part 24, the detection target current (i.e. input current of the reverse converter 21) may be calculated based on the motor output value of the motor 3 (i.e. corresponding to output consumed power of reverse converter 21), voltage of the DC link capacitor 22 (i.e. input voltage of reverse converter 21), and power factor of the output power of the reverse converter 21.

In addition, in the aforementioned embodiment, although the capacitance decline detection part 27 detects the capacitance decline in the DC link capacitor 22 by comparing the obtained capacitance value and a threshold that was stored in advance, the present invention is not to be limited thereto. For example, the capacitance decline detection part 27 may detect a capacitance decline in the DC link capacitor 22 when the obtained capacitance value changes (decreases).

EXPLANATION OF REFERENCE NUMERALS 1, 1X motor drive device
2 AC power source
3 motor
10, 10X converter section
11 forward converter 13, 14 current detection part
15 voltage detection part
16 storage part
17 capacitance decline detection part
20, 20X inverter section
21 reverse converter
22 DC link capacitor
23 first current detection part
24 second current detection part
25 voltage detection part
26 storage part
27 capacitance decline detection part

What is claimed is:

1. A motor drive device comprising:
at least one reverse converter that converts DC power from a forward converter, which converts AC power into the DC power, into AC power;
a DC link capacitor provided to each of the reverse converters in a DC link between the forward converter and the reverse converter;
a first current detection part that detects current flowing between the forward converter and the DC link capacitor in the DC link;
a second current detection part that detects current flowing between the DC link capacitor and the reverse converter in the DC link;
a voltage detection part that detects a voltage of the DC link capacitor; and
a capacitance decline detection part that obtains, from an integrated value by integrating a difference between a current value detected by the first current detection part and a current value detected by the second current detection part over a predetermined time, a change amount in electric charge of the DC link capacitor for the predetermined time; obtains a change amount in voltage of the DC link capacitor for the predetermined time based on a voltage value detected by the voltage detection part; obtains a capacitance value of the DC link capacitor based on the change amount in electric charge and the change amount in voltage obtained; and performs detection of a capacitance decline in the DC link capacitor based on the capacitance value obtained.

2. The motor drive device according to claim 1, further comprising a storage part that stores in advance a threshold for detecting the capacitance decline in the DC link capacitor,
wherein the capacitance decline detection part detects that the capacitance of the DC link capacitor has declined in a case of the capacitance value obtained being less than the threshold.

3. The motor drive device according to claim 2, wherein the storage part is rewritable and rewrites the threshold according to an external device.

* * * * *